United States Patent
Howell et al.

(10) Patent No.: US 9,394,872 B2
(45) Date of Patent: Jul. 19, 2016

(54) METHOD OF CONTROLLING THE STOPPING AND STARTING OF AN ENGINE OF A MOTOR VEHICLE

(71) Applicant: Ford Global Technologies, LLC, Dearborn, MI (US)

(72) Inventors: Stephen Howell, Norwich (GB); Anthemios Philemon Petridis, Bishop's Stortford (GB); Richard John Hippley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 14/329,450

(22) Filed: Jul. 11, 2014

(65) Prior Publication Data

US 2015/0066338 A1    Mar. 5, 2015

(30) Foreign Application Priority Data

Aug. 30, 2013 (GB) .................................. 1315500.7

(51) Int. Cl.
| | |
|---|---|
| *F02N 11/08* | (2006.01) |
| *F02N 11/10* | (2006.01) |
| *F02D 41/00* | (2006.01) |
| *F02D 41/04* | (2006.01) |
| *F02D 41/12* | (2006.01) |

(52) U.S. Cl.
CPC ........ *F02N 11/0822* (2013.01); *F02D 41/0002* (2013.01); *F02D 41/0005* (2013.01); *F02D 41/042* (2013.01); *F02N 11/0844* (2013.01); *F02N 11/0851* (2013.01); *F02N 11/0855* (2013.01); *F02N 11/105* (2013.01); *F02D 41/12* (2013.01); *F02D 2200/0406* (2013.01); *F02N 2200/022* (2013.01); *F02N 2250/04* (2013.01); *Y02T 10/42* (2013.01); *Y02T 10/48* (2013.01)

(58) Field of Classification Search
CPC . F02N 11/08; F02N 11/0822; F02N 11/0844; F02N 11/0855; F02N 11/05; F02D 41/00; F02D 41/0005; F02D 41/0002; F02D 41/042; F02D 41/12; F02D 2200/0406; Y02T 10/42; Y02T 10/48
See application file for complete search history.

(56) References Cited

U.S. PATENT DOCUMENTS

| | | | |
|---|---|---|---|
| 8,140,247 B2 | 3/2012 | Gibson et al. | |
| 8,290,693 B2 * | 10/2012 | Shoda | F02D 41/0002 123/179.18 |
| 8,355,860 B2 | 1/2013 | Liu et al. | |
| 8,412,443 B2 | 4/2013 | Gibson | |
| 8,855,896 B2 * | 10/2014 | Ma | F02D 17/04 123/179.4 |
| 2010/0229815 A1 | 9/2010 | Senda et al. | |
| 2012/0245831 A1 | 9/2012 | Patterson et al. | |
| 2012/0247414 A1 | 10/2012 | Crisp et al. | |

FOREIGN PATENT DOCUMENTS

| | | |
|---|---|---|
| EP | 1406010 A2 | 4/2004 |
| EP | 2177740 A2 | 4/2010 |
| GB | 2517752 A | 3/2015 |
| JP | 2003172237 A | 6/2003 |
| JP | 2006258078 A | 9/2006 |

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

A method of controlling the stopping and starting of an engine is disclosed in which, during an engine shut-down period, if a signal indicative of a request for restarting the engine is generated, the engine 1000 is restarted if the engine speed (N) is within a predefined speed range and the absolute pressure (MAP) in a manifold of the engine is below a predefined limit $MAP_{lim}$.

18 Claims, 5 Drawing Sheets

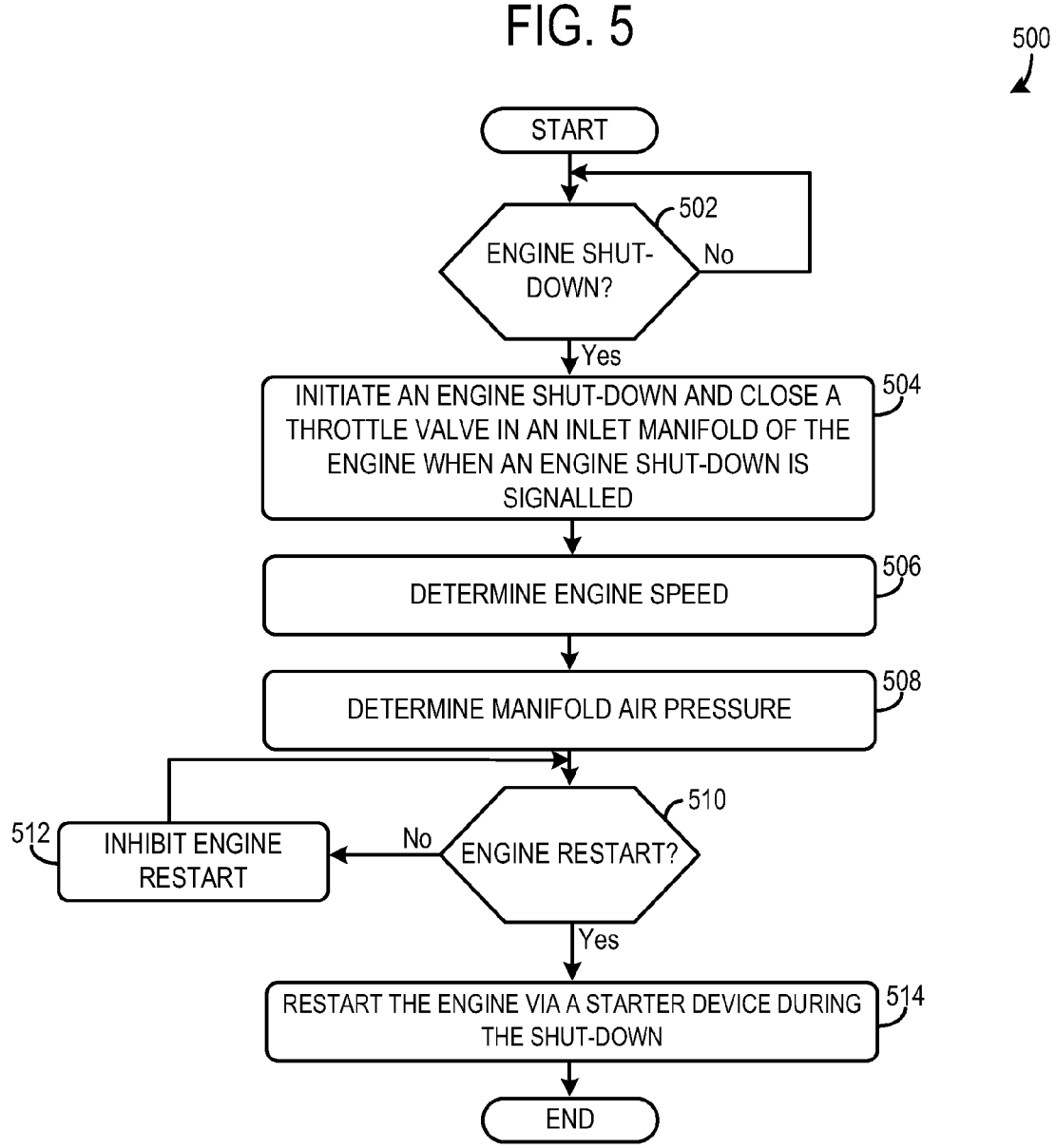

METHOD OF CONTROLLING THE STOPPING AND STARTING OF AN ENGINE OF A MOTOR VEHICLE

CROSS REFERENCE TO RELATED APPLICATIONS

This application claims priority to G.B. patent Application Number 1315500.7, "A METHOD OF CONTROLLING THE STOPPING AND STARTING OF AN ENGINE OF A MOTOR VEHICLE," filed Aug. 30, 2013, the entire contents of which are hereby incorporated by reference for all purposes.

FIELD

The present disclosure relates to a method for managing stopping and starting of the engine by a stop-start controller.

BACKGROUND AND SUMMARY

Motor vehicles with a stop-start control system for automatically stopping and starting an internal combustion engine used to provide motive power for the motor vehicle. The stop-start systems may automatically stop the engine based partially upon driver actions, such as brake pedal actuation and accelerator pedal actuation. Furthermore, these type of stop-start systems are used reduce engine fuel consumption and engine emissions. Specifically, different driver actions may be used to affect stopping and starting of the engine depending upon whether the system is applied to a manual transmission or an automatic transmission. In the case of a manual transmission two common control modes are often referred to as "stop in-gear" and "stop in neutral."

In some circumstances, a driver 'change of mind' may occur during the period following a decision to stop the engine but before the engine has actually stopped and is rotating at 0 revolutions per minute (RPM). A change of mind may result from an unexpected change in traffic conditions or because the driver has inadvertently changed the state of one or more driver operable control devices such that the system logic acts to re-start the engine. In a 'change of mind' event it may be desirable to re-start the engine of a vehicle equipped with stop-start technology in a short period of time (e.g., minimum amount of time possible). In order to re-start the engine in this scenario, a starter motor component may be engaged with a ring gear before the latter has completely stopped rotating in order to reduce the delay in restarting the engine. However, there may be a small range of engine speed where the starter motor can be engaged without damage occurring to the starter motor or ring gear. Additionally, engagement of the starter motor when the engine is rotating in a reverse direction may be inhibited due to the high probability of damage occurring.

The speed profile of a stopping engine may be highly non-linear and that the instantaneous acceleration of the crankshaft can be such that the instantaneous speed can vary during the starter motor component travel time by a similar order of magnitude to the range of permitted speeds for starter engagement. To engage the starter motor component at the correct speed is therefore a significant challenge. One attempt overcome this challenge is to wait until the engine speed has reached zero before the engine starter motor is engaged. However, this will delay engine starting that may be needed by the driver to enable subsequent manoeuvring of the vehicle in traffic, away from hazards, etc. This not only impacts vehicle performance but may also decrease vehicle safety.

As such in one approach, a method of controlling the stopping and starting of an engine is provided. The method includes initiating an engine shut-down and closing a throttle valve in an inlet manifold of the engine when an engine shut-down is signalled. The method further includes using a starter device to restart the engine during the shut-down if starting is signalled, the engine speed is within predefined upper and lower limits, and an absolute pressure in the inlet manifold of the engine is below a predefined limit.

In this way, the engine may be quickly restarted after a "change of mind" event occurs while decreasing the likelihood of engine damage by using both an engine speed range and inlet manifold pressure as restart triggers. It will be particularly appreciated that when both engine speed and manifold pressure are used as safe restart indicator, the likelihood of damage to the starter motor is greatly reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 5 is a method for controlling an engine.

DETAILED DESCRIPTION

Figure 1:
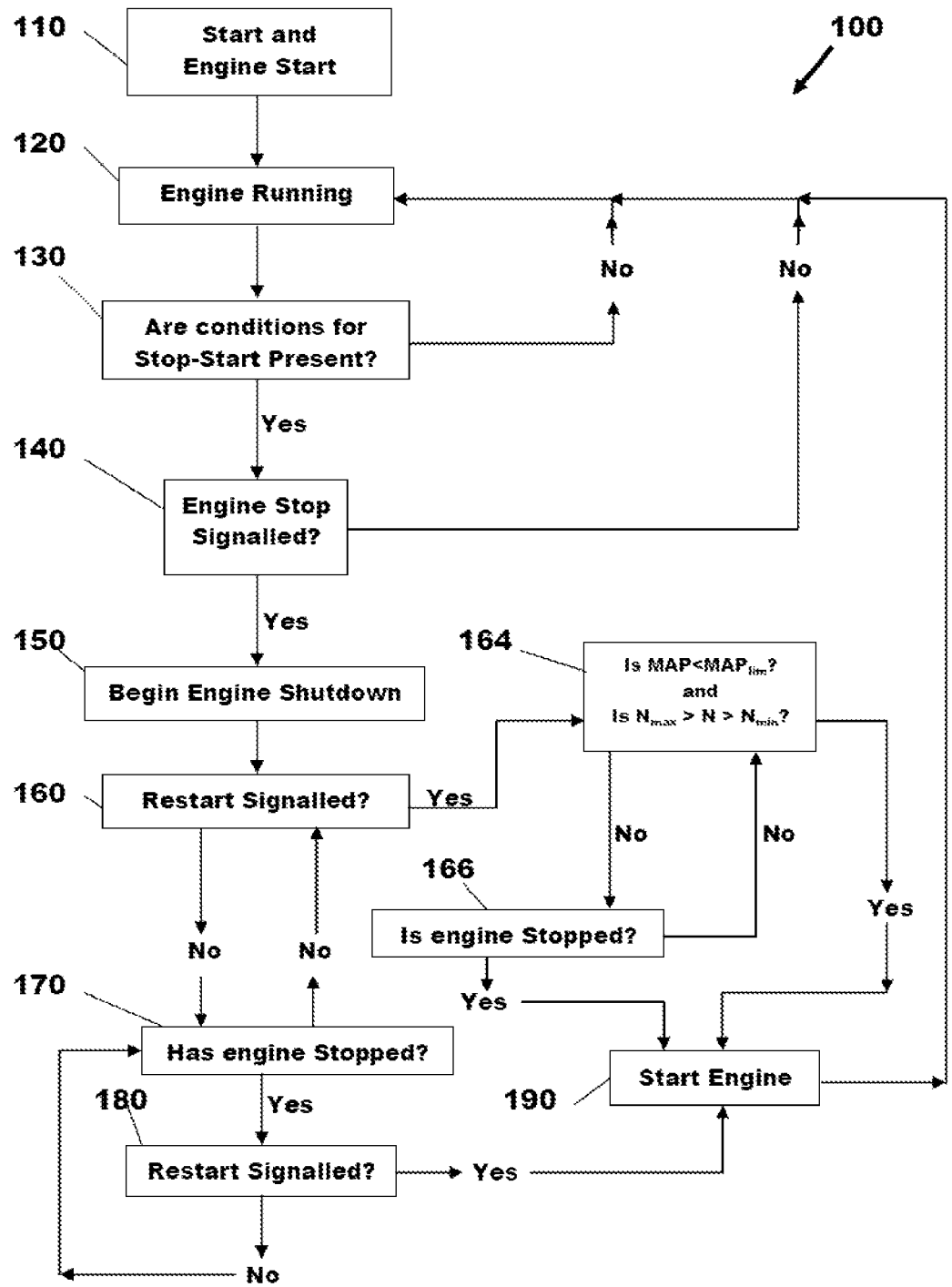
FIG. 1 is a high level flow chart of a method of controlling an engine according to an exemplary embodiment.

A method for quickly restarting an engine equipped with stop-start functionality while reducing the likelihood of starter-motor damage during restarting. The method includes shutting down the engine and closing a throttle valve and subsequently restarting the engine via a starter device when restart is signalled, the engine speed is within predefined upper and lower limits, and an absolute pressure in the inlet manifold of the engine is below a predefined limit.

In this way, several parameters (i.e., engine speed and manifold air pressure) may be used to indicate conditions where the starter-motor can be used to safely restart the engine with a greatly reduced likelihood of starter-motor damage. Additionally, closing the throttle during shut-down may greatly reduce the air that can be drawn into the cylinders of the engine to be compressed and expanded and reduces the absolute air pressure in the intake manifold as the engine 'pumps out' the air downstream of the intake throttle valve.

The method may further include automatically closing the throttle valve in the inlet manifold when an engine shut-down is signalled. Further in one example, the starter device may be one of a starter motor having a pinion for engagement with a ring gear to start the engine and a belt drive integrated starter generator.

According to a second aspect of the engine, there is provided a control system for an engine of a motor vehicle having an inlet manifold in which is mounted a throttle valve to vary the flow of air to the engine wherein the system includes a control module, a pressure sensor to sense the absolute pressure in an inlet manifold of the engine downstream from the throttle valve, a number of inputs to the control module providing signals indicative of when the engine should be stopped and started and the speed of the engine, an actuator for the throttle valve and a starter device for starting the engine, the control module being operable to initiate an engine shut-down and close the throttle valve in the inlet manifold of the engine when the inputs indicate that an engine shut-down is signalled and is further operable to restart the engine using the starter device during the shut-down if the inputs indicate that starting is signalled, the engine speed is between predefined upper and lower limits, and the absolute pressure sensed by the pressure sensor indicates that the absolute pressure in the inlet manifold of the engine is below a predefined limit.

In one example, the engine shut-down may be signalled when the inputs indicate that a predefined combination of control variables is present. Further in one example, restarting of the engine may be signalled if the inputs indicate that the state of at least one control variable changes to a state indicating that the engine should be started. Still further in another example, the starter device may be one of a starter motor having a pinion for engagement with a ring gear to start the engine and a belt drive integrated starter generator.

According to a third aspect of the engine there is provided a motor vehicle having an engine having an inlet manifold in which is mounted a throttle valve and a control system constructed in accordance with said second aspect of the engine.

The average deceleration during an engine run down may be at least partially (e.g., primarily) due to friction and other loads on the engine dissipating kinetic energy. Any speed oscillations and possible reverse running are primarily due to energy being stored and released as the engine continues to go through its compression cycle during shut-down.

Figure 4:
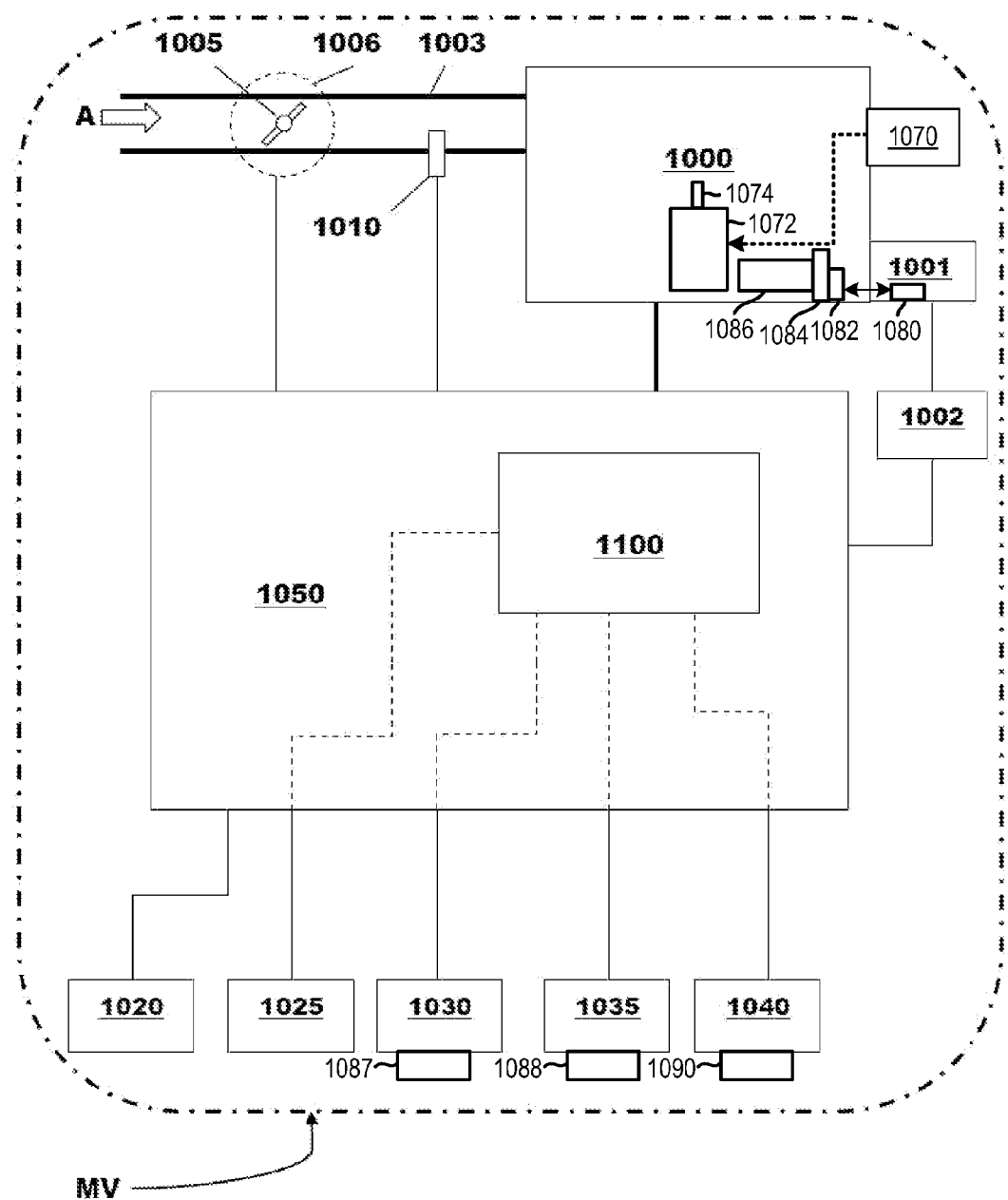
FIG. 4 is a schematic diagram of a motor vehicle having a control system according to an exemplary embodiment.

With reference to FIG. 1 there is shown a high level flow chart of a method 100 of controlling the stopping and starting of an engine such as the engine 1000 shown in FIG. 4. However, in other examples other suitable engines may be used to implement the method 100. The method starts at box 110 which are key-on and manual engine start steps performed by a user of a motor vehicle MV to which the engine 1000 is fitted.

The method then advances to box 120 where the engine is running. Then in box 130 it is tested whether the conditions for stop-start operation are present. For example and without limitation, is the temperature of the engine coolant above a predefined temperature or is there sufficient charge in a battery to enable (e.g., guarantee) restarting.

If these conditions are not met then the engine cannot be stopped even if an opportunity for stopping it arises and the method loops around (i.e., returns to) boxes 130 and 120 until either the conditions are met or a key-off event occurs causing the method to end.

If in box 130 the conditions are met then the method advances to box 140 where it is checked to see whether an engine stop is signalled by the actions of the driver. Various combinations could be used to signal that an engine stop is desired but in the case of this example for a vehicle having an automatic transmission, if the motor vehicle MV is stationary and an accelerator pedal is not being pressed and a brake pedal is being pressed then this is used to indicate that the engine should be stopped. However, other combinations of engine stop signals may be used to trigger engine shut-down.

If an engine stop is not signalled the method returns to box 120 but, if an engine stop is signalled, the method advances to box 150. In box 150 the engine shut-down commences. Various techniques of shutting down an engine may be used, but generally, in the case of a diesel engine, the fuel supply is terminated and, in the case of a gasoline engine, the sparking plugs are switched off and the fuel supply is cut. However, one key action that takes place irrespective of engine type is the shutting of a throttle valve in an air inlet of the engine. In one example, this may be done automatically via a signal from an engine controller or other control unit but in the case of a gasoline engine it is possible for the closing to be done in response to the actions of a driver on an accelerator pedal. That is to say, because one of the conditions for determining whether the engine should be shut-down is that the accelerator pedal is not being pressed this will result in the throttle valve being closed and so there may be no need for automatic intervention. However, automatic closing of the throttle valve may be used because it reduces (e.g., eliminates) the risk of the driver manipulating the accelerator pedal during the engine shut-down.

Following on from box 150, in box 160 there is a "change of mind" intervention during the shut-down of the engine. That is to say, during the engine shut-down the driver has removed their foot from the brake pedal or other braking mechanism which is the change of state required to signal an engine restart. It will be appreciated that additional or alternative triggers may be used to indicate a desire to restart the engine via the driver such as depression of an accelerator pedal or other torque request mechanism.

If there is a "change of mind" in box 160 the method advances from box 160 to box 164. In box 164 it is tested to see whether it is safe to engage a starter motor to start the engine.

The test in box 164 comprises two parts:
a/ Is the current instantaneous engine speed (N) within a speed range defined by predefined upper and lower speed limits $N_{max}$ and $N_{min}$. That is to say, is $N_{max} > N > N_{min}$?
and
b/ Is the absolute pressure (MAP) downstream of the throttle valve in the air inlet to the engine lower than a predefined pressure limit $MAP_{lim}$. That is to say, is $MAP < MAP_{lim}$?

For starting to commence both of these tests have to be passed. In the case of one exemplary engine, the upper speed limit $N_{max}$ was 200 Rpm, the lower speed limit $N_{min}$ was 50 Rpm and the absolute pressure limit was 40 kPa. It will however be appreciated that these are provided by way of example and that other values could be used for different engine and starter motor configurations.

If both of the tests are passed then the method advances to box 190 and the engine is started using the starter motor and the method then returns to box 120 with the engine running.

If one or both of the tests are failed in box 164 then the method loops around (i.e., returns to) boxes 166 and 164 until either the two tests in box 164 have been passed or the engine has stopped rotating. In either case, the method advances to box 190 and then on to box 120, as previously discussed.

Referring back to box 160, if there is no 'change of mind', the method advances to box 170 with the engine stopped and will then loop around boxes 170 and 180 until a restart is signalled in box 180. As before, a restart will be signalled in this case if the driver removes their foot from the brake pedal. If a restart is signalled in box 180, the method advances to box 190 where the engine is started using the starter motor and then returns to box 120 with the engine running.

It will be appreciated that the engine can be quickly (e.g., immediately) started in box 190 because the engine is stationary, if desired. The only time delay in this case being the time taken for a pinion of the starter motor to engage with a ring gear fitted to a flywheel of the engine.

The time taken from the point that engagement is initiated to the point where a pinion of the starter motor first contacts a ring gear attached to a flywheel of the engine (the pinion travel time) may also be dependent on electrical and mechanical design of the starter motor, wiring and power supply as well as environmental and aging factors such as temperature, battery state of charge and starter contamination. This pinion travel time may be of the order of a few tens of milliseconds such as, for example, 50 ms.

Figure 2A:
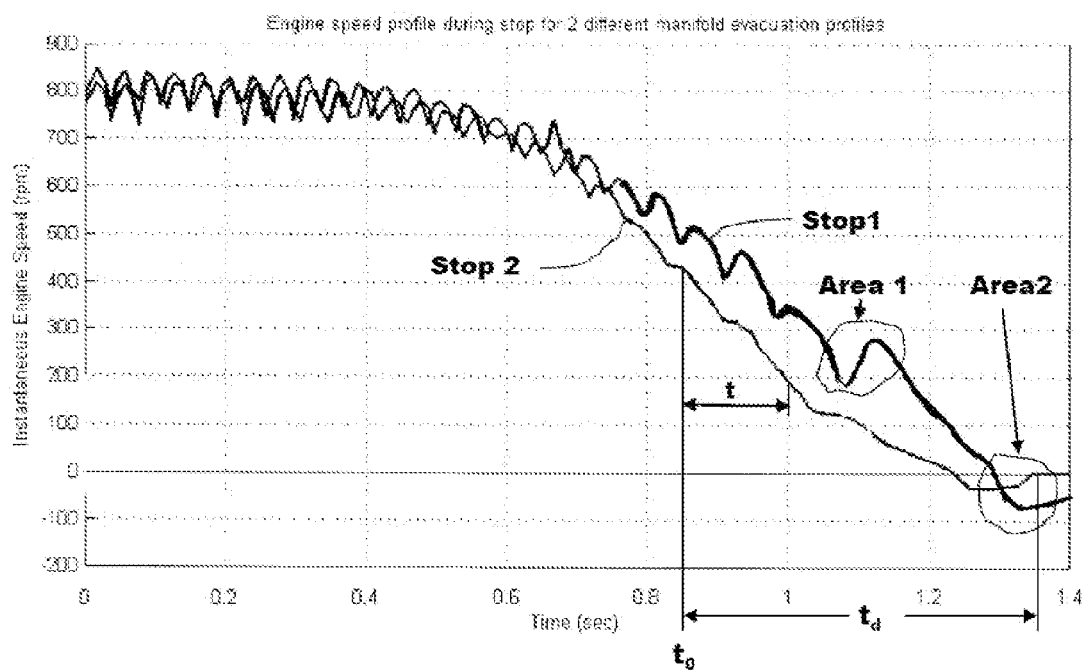
FIG. 2*a* is a graph showing the relationship between engine speed and time for two exemplary engine shut-downs.

FIG. 2a shows two exemplary engine shut-downs referenced as Stop 1 and Stop 2. In the case of Stop 1 the engine slows during the shut-down but there are large variations in the instantaneous engine speed. This could be due, for example, to the throttle valve not closing fully, late closing of the throttle valve or leakage in the inlet manifold downstream of the throttle valve.

In the case of Stop 2, the engine slows at a similar rate but the variations in instantaneous engine speed may be generally insignificant. In this case the throttle valve has closed fully early in the engine shut-down and there are no inlet manifold leaks downstream of the throttle valve.

Figure 3:
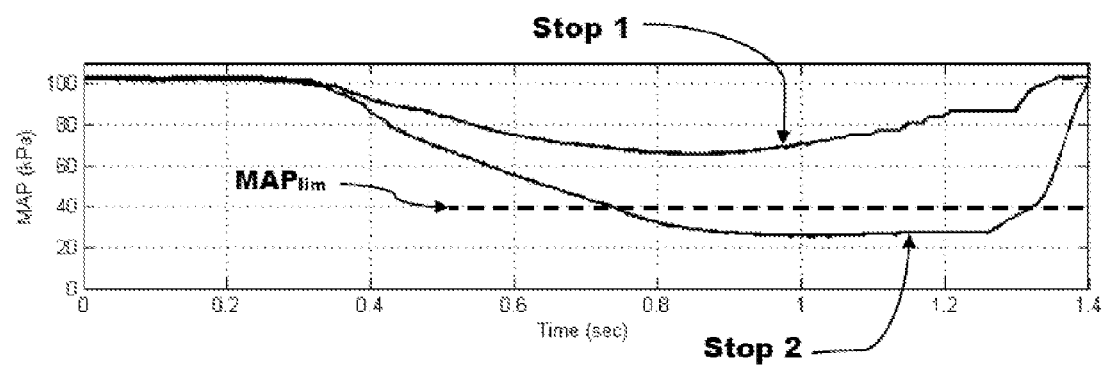
FIG. 3 is a graph showing the relationship between absolute manifold pressure and time for the two engine shut-downs shown in FIG. 2.

FIG. 3 shows corresponding manifold absolute pressure traces for the Stops 1 and 2 from which it can be seen that the manifold absolute pressure (MAP) is considerably lower in the case of Stop 2 than it is for Stop 1.

Figure 2B:
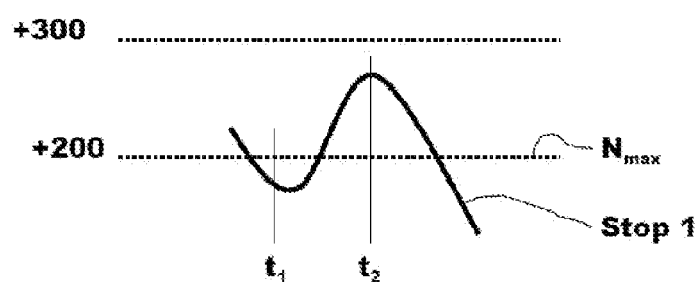
FIGS. 2*b* and 2*c* are portions of the graph shown in FIG. 2*a* on an enlarged scale.

FIG. 2b shows an Area 1 on FIG. 2a on an enlarged scale as it relates to Stop 1. At time $t_1$ the speed of the engine is below the maximum speed limit $N_{max}$ where the starter motor can be engaged safely and reliably. $N_{max}$=200 Rpm in this case. However, at time $t_2$ which follows $t_1$ by a short period of time representing the time required for the starter motor to be engaged, the engine speed has risen to a speed greater than $N_{max}$ and in this case to 260 RPM. Therefore in the case of Stop 1 the considerable fluctuations in the instantaneous engine speed would result in a potentially damaging or unreliable starter motor engagement and for this reason starting would need to be delayed until the engine has stopped rotating.

Figure 2C:
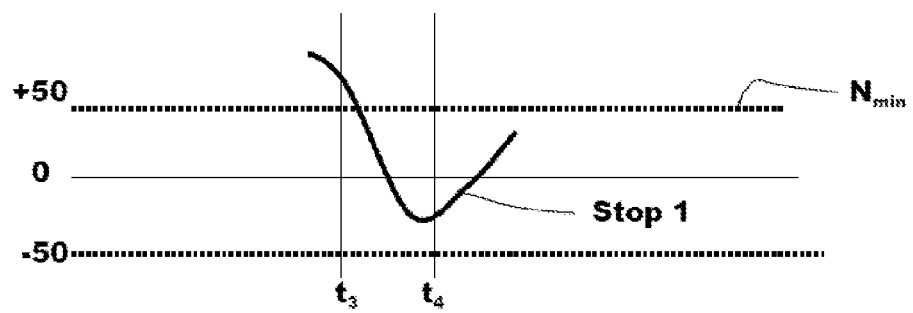

FIG. 2c shows an Area 2 on FIG. 2a on an enlarged scale as it relates to Stop 1. At time $t_3$ the speed of the engine is above the minimum speed limit $N_{min}$ where the starter motor can be engaged without significant damage and in a reliable manner. $N_{min}$=50 Rpm in this case. However, at time $t_4$ which follows $t_3$ by a short period of time representing the time needed for the starter motor to be engaged, the engine speed has fallen to a speed less than $N_{min}$ and in this case to minus 25 RPM. Therefore in the case of Stop 1 the considerable fluctuations in the instantaneous engine speed would once again result in a potentially damaging or unreliable starter motor engagement and for this reason starting would desirably be delayed until the engine has stopped rotating. In the case of Stop 2 this would not be the case because there are no significant fluctuations in instantaneous engine speed particularly in the areas of interest for engine starting using a starter motor.

The inventors have therefore deduced that if the engine shut-down is similar to that of Stop 2 then the starter motor can be engaged without significant damage in a reliable manner within a predefined speed range which in this case is set at +200 Rpm to +50 RPM.

The inventors have also realised that it is possible to predict whether the shut-down is of the Stop 1 type or the Stop 2 type by measuring the absolute pressure (MAP) in the inlet manifold downstream of the throttle valve and setting a limit value ($MAP_{lim}$) for manifold absolute pressure that is desirably achieved in order to permit starter motor engagement prior to a full engine stop.

The effect of applying such a technique can be demonstrated with reference to FIG. 2a where at time $t_0$ a "change of mind" engine start is signalled. If the engine restart functionality described herein is not used, a time delay $t_d$ is required to allow the engine to come to a stop after which the starter motor can be reliably engaged without damage.

However, if the engine restart functionality described herein is used, then as soon as the engine speed falls below the upper engine speed limit $N_{max}$ (e.g., 200 Rpm), which occurs in this case t seconds after time $t_0$, engagement of the starter motor can commence. Therefore the time delay between the signalling of a restart and engagement of the starter motor has been reduced by ($t_d$-t) seconds which for the example given is 0.4 seconds.

Although this may appear to be an insignificant amount of time in the context of driver impression of the urgency of response to a "change of mind" it is a worthwhile improvement and represents a reduction of 79% in the time delay between the occurrence of the 'change of mind' event and the initiation of the starter motor. As a result, the driver can more quickly provide motive power to the vehicle to manoeuvre the vehicle, thereby improving customer satisfaction and driver safety.

With reference to FIG. 4 there is shown a motor vehicle MV having an internal combustion engine 1000 and a control system including a system control module 1050.

The engine 1000 is started via a starter device 1001 (e.g., starter motor). The starter device may include a component 1080 (e.g., pinion) engageable with a ring gear 1082 fastened to a flywheel 1084 of the engine 1000. Alternatively, the component 1080 may be a belt drive and the starter device may be a starter generator and the belt drive may be integrated into the starter generator. The starter device 1001 may be energised via a starter motor power unit 1002 in response to a signal from the control module 1050.

The engine 1000 has an inlet manifold 1003 in which is mounted an inlet throttle valve 1005 to control the flow of air into the engine 1000. The engine 1000 also includes at least one cylinder 1072 having one or more spark plugs 1074 coupled thereto and a fuel injection system 1070 configured to provide fuel to the engine 1000 and specifically the cylinder 1072.

Operation of the inlet throttle valve 1005 is controllable via an actuator 1006 which is operable in response to a control signal from the control module 1050 to rotate the throttle valve 1005 in the inlet manifold 1003. Therefore, the actuator 1006 is coupled to the throttle valve 1005 and configured to control operation (e.g., open and close) of the throttle valve.

The throttle valve 1003 is configured to vary a flow of air drawn into the engine 1000 in the direction indicated by the arrow "A". When the throttle valve 1005 is fully closed, the engine 1000 will pump the air out of the inlet manifold 1003 downstream of the throttle valve 1003 thereby causing the absolute pressure in the inlet manifold 1003 to fall. The absolute pressure downstream of the throttle valve 1005 is sensed by a manifold absolute pressure sensor 1010 connected to the control module 1050.

The control module 1050 includes in this case a stop-start controller 1100 although it will be appreciated that stop-start controller 1100 could be a separate unit operably connected to the control module 1050. The control module 1050 has a number of inputs 1020, 1025, 1030, 1035 and 1040 used to control operation of the engine 1000. The first input 1020 is a schematic representation of a number of inputs relating to the running conditions of the motor vehicle MV such as, for example, engine rotational speed, atmospheric pressure, ambient temperature, exhaust gas constitution, engine coolant temperature, vehicle speed and state of charge of a main battery. It will be appreciated that sensors may provide the aforementioned inputs.

The second input 1025 provides an input indicative of the engagement state of a transmission 1086 of the motor vehicle MV. Typically this will indicate either whether the transmission is in neutral or in-gear. As shown, the transmission 1086 is coupled to the flywheel 1084.

The third input 1030 provides an input indicative of the state of an accelerator pedal 1087 used by a driver of the motor vehicle MV to indicate the required torque to be provided from the engine 1000.

The fourth input 1035 provides an input indicative of the state of a brake pedal 1088 or other suitable braking device of the motor vehicle MV. The input 1035 will indicate whether the brake pedal is being pressed or not pressed.

The fifth input 1040 provides an input indicative of the state of a clutch pedal 1090 of the motor vehicle MV. The input 1040 will indicate whether the clutch pedal is being depressed or not depressed. This input is only required if the motor vehicle MV has a manual transmission using a manually operated clutch pedal to effect engagement and disengagement of a clutch located between the engine 1000 and the transmission. With such an arrangement it is usual to calibrate the movement of the clutch pedal such that, when it can be safely assumed that the clutch is fully disengaged, the clutch pedal is termed 'depressed' and when the clutch pedal is not depressed it can be either 'pressed' or released. The pressed state is one where the driver has moved the clutch pedal but insufficiently to guarantee that the clutch is fully disengaged.

The second through fifth inputs 1025 to 1040 can be used by the stop-start controller 1100 in various combinations and various manners to determine when the engine 1000 should be automatically stopped to save fuel and also when it needs to be restarted from the stopped state.

For the purpose of explaining the operation of the control system as it applies to engine control the following control variable states will be assumed for stopping and starting of the engine 1000. However, it will be appreciated that various other combinations of control variable state could be used and that the methods, control techniques, etc., described herein are not limited to the exact combination described hereinafter.

In the case of an engine stop, a stop will be initiated if:—
a/ the transmission is in neutral; and
b/ the clutch pedal is released; and
c/ the brake pedal is pressed; and
d/ the motor vehicle is stationary.
In the case of an engine start, a start will be initiated if:—
e/ the transmission is in neutral;
and either
f/ the clutch pedal state changes from released to any other state;
or
g/ the brake pedal state changes from pressed to released.

Operation of the control system is as follows:—
The control module 1050 is configured to continuously monitor the inputs 1020 and the input from the manifold pressure sensor 1010 in order to control normal running of the engine 1000 and controls the throttle valve 1005 via the actuator 1006 to produce the required torque from the engine 1000 and to satisfy any emission requirements for the engine 1000.

The stop-start controller 1100 monitors the inputs from the transmission state sensor 1025, accelerator pedal sensor 1030, brake pedal sensor 1035 and clutch pedal position sensor 1040. It will be appreciated that all of the signals received by the control module 1050 can be shared with the stop-start controller 1100 and vice-versa.

If the stop-start controller 1100 determines that the state of all of the control variables a to d listed above are as needed for a shut-down then shut-down of the engine 1000 may be signalled in order to save fuel and reduce emissions.

The stop-start controller 1100 may then take the needed steps to perform the engine shut down which in this case comprise shutting of the fuel supply to the engine 1000, switching off the spark plugs and closing the inlet throttle valve 1005. After these actions have been taken the engine 1000 will begin to stop or run down until after a certain period of time it will have stopped. From this stopped state the engine will be started if the state of all of the control variables is as given in e to f above. That is to say, if the transmission is in neutral and either the clutch pedal state changes from released to a non-released state (e.g., pressed or depressed) or the state of the brake pedal changes from pressed to released then the engine 1000 is started immediately using the starter motor 1001 which is supplied with power by the starter motor power unit 1002 in response to a signal from the control module 1050.

If during the shut-down period there is a change of mind event such as for example, if the clutch pedal state is changed from a released state to a pressed state during the shut-down or the brake pedal state changes from a pressed state to a released state during the shut-down then the engine 1000 may be restarted quickly (e.g., as quickly as possible). However, as previously discussed the starter motor 1001 can only be engaged when certain engine speed conditions are present in order to reduce the likelihood (e.g., prevent) damage from occurring to the starter motor 1001 and, in particular, to the starter motor pinion and the ring gear on the flywheel.

Therefore before the starter motor 1001 is engaged it is first tested whether the conditions for a safe restart are present. In the case of the restarting method described herein this test includes determining whether the engine speed (N) is between an upper speed limit $N_{max}$ and a lower speed limit $N_{min}$ and using the manifold absolute pressure sensor 1010 to sense whether the absolute pressure (MAP) in the inlet manifold 1003 is below a predefined limit $MAP_{lim}$.

Therefore, if $N_{max} > N > N_{min}$ and $MAP < MAP_{lim}$, the starter motor 1001 may be energised by the starter motor power unit 1002 in response to a signal from one of the control module 1050 and the stop-start controller 1100 depending upon the exact construction used, in on example. However, if either the engine speed (N) is not within the predefined speed range bounded by the upper speed limit $N_{max}$ and the lower speed limit $N_{min}$ or the absolute pressure (MAP) in the inlet manifold 1003 is not below the predefined limit $MAP_{lim}$, the starter motor 1001 may not be energised and the control module 1050 will continue to monitor the absolute pressure (MAP) in the inlet manifold 1003 and the engine speed (N).

It will be appreciated that, the engine 1000 may come to a halt before the test conditions to permit restarting have been met. In such a case, the engine 1000 can be immediately restarted because it is then stationary. That is to say, the engine 1000 is only in a shut-down phase needing limits on restarting while it is rotating.

One of the advantages of the aforementioned restart technique is that a delay in response to a "change of mind" can be reduced in a simple manner without the need for complex engine instantaneous speed predictions to be made, if desired.

A second advantage of the aforementioned restart technique is that all of the hardware needed to implement the technique is already present on most production motor vehicles having stop-start control thereby incurring no additional manufacturing costs.

Although the aforementioned restart technique is particularly advantageous where a starter motor having a pinion that has to be engaged with a ring gear to start the engine, the restart technique also has advantage in the case of a belt drive integrated starter generator (BISG) in a Change of Mind situation.

The high instantaneous accelerations of a 'rough' shutdown of the kind indicated by Plot 1 on FIG. 2a potentially produce large variations in belt tension. In some cases it is undesirable to add the tension of a start event to these variations. For example, the start event and the peak tension due to the fluctuating speed profile could cause excessive belt tension. Alternatively, a start event during a 'trough' in speed might result in low belt tension and the motor load to start excessively low and then step up rapidly when the slack is reduced.

By only using the BISG when it is known that either the engine has halted or the shutdown is a stable, smooth one implied by the presence of low MAP, the tension on the belt is less variable and so fewer problems are likely to arise with the drive belt such as jumping, excessive wear or degradation. A similar control system and operating methodology can be used to that used for the starter motor described above. It will be appreciated that, if the engine speed at the time the change of mind occurs is above a predefined speed such as, for example 500 Rpm, the engine can be restarted in a passive manner utilising stored inertia without the use of any form of starter device.

FIG. 5 shows a method 500 for controlling an engine. The method may be implemented by the engine, engine components, vehicle components, etc., described above with regard to FIG. 4 or may be implemented via other suitable engines, engine components, vehicle components, etc.

At 502 the method determines if the engine should be shut-down. If it is determined that the engine should not be shut-down (NO at 502) the method returns to 502. However, if it is determined that the engine should be shut-down (YES at 502) the method advances to 504. As previously discussed, brake pedal actuation may trigger a positive determination of engine shut-down.

At 504 the method includes initiating an engine shut-down and closing a throttle valve in an inlet manifold of the engine when an engine shut-down is signalled. Initiating engine shut-down may include inhibiting cylinder fuel injection and/or cylinder ignition. In this way combustion cycles in the engine are discontinued.

Next at 506 the method includes determining engine speed and at 508 the method includes determining manifold air pressure. At 510 the method determines if the engine should be restarted. Engine restart may be determined based on engine speed and manifold air pressure. Specifically, it may be determined that engine restart should be initiated when starting is signalled, the engine speed is within predefined upper and lower limits, and an absolute pressure in the inlet manifold of the engine is below a predefined limit. In one example, the upper limit is 200 revolutions per minute (RPM) and the lower limit is 50 RPM. In another example, the predefined limit of the absolute pressure is 40 kilopascals (kPa).

If it is determined that the engine should not be restarted (NO at 510) the method advances to 512. At 512 the method includes inhibiting engine restart. In some examples, inhibiting engine restart may include delaying restart for a period of time (e.g., predetermined period of time). After 512 the method returns to 510.

However, if it is determined that the engine should be restarted (YES at 510) the method advances to 514. At 514 the method includes restarting the engine via a starter device during the shut-down. Restarting the engine may include engaging a pinion in the starter device with a ring gear coupled to a flywheel, in one example. Restarting the engine may also include delivering fuel to a cylinder in the engine, in another example.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The method described above for operating a vehicle is not limited to the measures and embodiments disclosed herein, but naturally also encompasses similarly acting measures and embodiments. Furthermore, a person skilled in the art understands that, although the invention has been described by way of example with reference to one or a plurality of embodiments, it is not limited to the disclosed embodiments and that alternative embodiments could be constructed without departing from the scope of protection of the invention as defined by the accompanying claims.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A control system for an engine of a motor vehicle having an inlet manifold in which is mounted a throttle valve to vary the flow of air to the engine, comprising:
    a pressure sensor configured to sense the absolute pressure in an inlet manifold of the engine downstream from the throttle valve;
    a number of inputs to a control module providing signals indicative of when the engine should be stopped and started and the speed of the engine;
    an actuator coupled to the throttle valve; and
    a starter device configured to start the engine;
    where the control module is operable to initiate an engine shut-down and close the throttle valve in the inlet manifold of the engine when the inputs indicate that an engine shut-down is signalled and is further operable to restart the engine using the starter device during the shut-down if the inputs indicate that starting is signalled, the engine speed is between predefined upper and lower limits and the absolute pressure sensed by the pressure sensor indicates that the absolute pressure in the inlet manifold of the engine is below a predefined limit.

2. The control system of claim 1, where an engine shut-down is signalled when the inputs indicate that a predefined combination of control variables is present.

3. The control system of claim 2, where restarting of the engine is signalled if the inputs indicate that the state of at least one control variable changes to a state indicating that the engine should be started.

4. The control system of claim 1, where the starter device is one of a starter motor having a pinion for engagement with a ring gear to start the engine and a belt drive integrated starter generator.

5. A method of controlling stopping and starting of an engine comprising:
    initiating an engine shut-down and closing a throttle valve in an inlet manifold of the engine when an engine shut-down is signalled; and
    using a starter device to restart the engine during the shut-down if starting is signalled, the engine speed is within predefined upper and lower limits, and an absolute pressure in the inlet manifold of the engine is below a predefined limit.

6. The method of claim 5, where the throttle valve in the inlet manifold is automatically closed when the engine shut-down is signalled.

7. The method of claim 5, where an engine shut-down is signalled when a predefined combination of control variables is present.

8. The method of claim 7, where restarting of the engine is signalled if the state of at least one control variable changes to a state indicating that the engine should be started.

9. The method of claim 5, where the starter device is one of a starter motor having a pinion for engagement with a ring gear to start the engine and a belt drive integrated starter generator.

10. The method of claim 5, where upper limit is 200 revolutions per minute (RPM) and 200 RPM and the lower limit is 50 RPM.

11. The method of claim 5, where a lower limit of the speed range is greater than 0.

12. The method of claim 5, where the predefined limit of the absolute pressure is 40 kilopascals (kPa).

13. A method for controlling an engine, comprising:
    initiating an engine shut-down and closing a throttle valve in an inlet manifold of the engine when an engine shut-down is signalled;
    restarting the engine via a starter device during the shut-down if starting is signalled, the engine speed is within predefined upper and lower limits, and an absolute pressure in the inlet manifold of the engine is below a predefined limit; and
    inhibiting engine starting, if starting is not signalled, the engine speed is not within the predefined upper and lower limits, or an absolute pressure in the inlet manifold of the engine is not below the predefined limit.

14. The method of claim 13, where inhibiting starting includes delaying engine starting for a period of time.

15. The method of claim 13, where upper limit is 200 revolutions per minute (RPM) and the lower limit is 50 RPM.

16. The method of claim 13, where the predefined limit of the absolute pressure is 40 kilopascals (kPa).

17. The method of claim 13, where restarting the engine include engaging a pinion in the starter device with a ring gear coupled to a flywheel.

18. The method of claim 17, where restarting the engine includes delivering fuel to a cylinder in the engine.

* * * * *